United States Patent Office 3,370,056
Patented Feb. 20, 1968

3,370,056
PRODUCTION OF POLYOXYALKYLENE ETHERS
Masaru Yotsuzuka, Kobe, and Katsuhisa Kodama, Nishinomiya, and Katsuhiko Ogino, Suita, Japan, assignors to Takeda Chemical Industries, Ltd., Osaka, Japan
No Drawing. Filed Apr. 1, 1964, Ser. No. 356,648
Claims priority, application Japan, Apr. 4, 1963, 38/18,272
6 Claims. (Cl. 260—209)

ABSTRACT OF THE DISCLOSURE

A process is provided for the production of polyoxyalkylene polymers. The process comprises allowing alkylene oxide to react with an initiator having at least one active hydrogen atom in the presence of a solid catalyst. The catalyst employed consists essentially of an alkaline substance selected from the group consisting of alkali metal hydroxides and alkali metal lower alkoxides supported on a solid carrier which is inert to the alkaline substance.

This invention relates to an improvement in the production of polyoxyalkylene polymers.

Polyoxyalkylene polymers, especially those which are obtained by the polymerizing alkylene oxide additively to a compound having active hydrogen atom or active hydrogen atoms in its molecule are useful as interface active agents or the raw materials therefor, textile auxiliary, lubricating oil, brake oil, ointment base, mold release agent, and raw material for the manufacture of polyurethane resins.

These polyoxyalkylene polymers have hitherto been produced industrially by reacting alkylene oxide with an initiator in the presence of caustic alkali or alkali metal alkoxide.

The known process, however, is inevitably accompanied with shortcomings, which are not desirable for industrial production of these polyoxyalkylene polymers. For example, in the known process, it takes a long time to dissolve the catalyst in an initiator and the resulting solution is too high in viscosity to carry out freely the addition polymerization reaction. Indeed it is generally admitted that side-reaction producing diols should be avoided as far as possible, especially when polyfunctional polymers having not less than three hydroxyl groups or mono-functional polymers are desired, but the side-reaction has never been avoidable when caustic alkali is employed as the catalyst. Moreover, caustic alkali usually contains 10% or more of water, and the addition of alkylene oxide to the water takes place also to yield diols, In order to avoid this difficulty, a dehydration procedure is often employed after admixing initiator and the catalyst. But the dehydration results in high viscosity of the solution and in solidification or crystallization of alcoholate of the initiator used, these results making it more difficult to carry out subsequent reactions or procedures. While these undesirable phenomena are apt to happen when methanol or propylene glycol is used as the initiator, they take place more often, or rather inevitably, in the case where tri- or more polyfunctional initiators such as pentaerythriol, alkyl glycosides, alkylene diglycosides, disaccharides or trisaccharides are employed. In the worst case, reaction does not proceed any further. In order to relieve the industrial process from such difficulties, the use of a solvent such as dimethylsulfoxide, dimethylformamide, dimethylacetamide or acylmorpholine has generally been applied to the reaction of polyfunctional initiators, but the relief is not so sufficient as to make the process per se satisfactory. Another trial to relieve the difficulties is to heat the reaction mixture at a high temperature of 170°–200° C., but the trial is not desirable because it entails increases of unsaturation and of acid number or coloring in the product.

On the other hand, the present inventors have found that said reaction between initiator and alkylene oxide is smoothly catalyzed by a solid catalyst which is prepared by allowing a solid and inert carrier in granular or powdery form to support alkaline substance such as alkali metal hydroxide or alkali metal alkoxide. Subsequent investigations made by the present inventors have revealed that the use of the solid catalyst can provide quite desirable means for polymerization of alkylene oxide with an initiator, especially the polyfunctional initiator having three or more active hydrogen atoms in its molecule, in view of the facts (1) that the undesirable side reactions yielding mono-ols and diols from water hardly take place; (2) that it is neither necessary to have the catalyst dissolved in the initiator nor to dehydrate the mixture; (3) that mere addition of the solid catalyst to the initiator gives a mixture of low viscosity which can at once be used for the reaction with alkylene oxide and which brings neither inconvenience nor difficulty to the subsequent procedures; (4) that the resulting polyether polyols show excellent quality even in the case of their being polyfunctional ones; and (5) that most of the basic catalyst can be separated from the reaction mixture solely by filtration.

The object of the present invention is, therefore, to provide an improvement in the production of polyfunctional polyether polyols, whereby an industrial production of the same is remarkedly facilitated.

It is another object of this invention to provide an improved process for producing tri- or more functional polyether polyols which are of high quality and especially desirable for manufacture of polyurethane resins.

Said objects are realized by allowing alkylene oxide to react with an initiator in the presence of a solid catalyst on which alkaline substance is supported.

As the alkaline substance may be employed any of those bases the aqueous solution of which exhibits strong alkalinity, it being exemplified by alkali metal hydroxide such as sodium hydroxide or potassium hydroxide and alkali metal alkoxide such as sodium methoxide, potassium methoxide, sodium ethoxide, potassium ethoxide, sodium propoxide, potassium propoxide, sodium butoxide or potassium butoxide. Moreover, it is recommendable to employ as the alkaline substance an alkali metal alcoholate of the polyfunctional alcoholic initiator when the same initiator is to be reacted with alkylene oxide, since undesirable side-reactions yielding mono- or diols can thereby be prevented completely.

The solid and inert carriers are used in a form of powder or granule, and they include, for example, acid clay, kaolin, active carbon (e.g. active charcoal, bone black, blood charcoal), zeolites, synthetic zeolites (e.g. molecular sieves), diatomaceous earth, pottery powder, magnesium oxide or similar metallic oxides or hydroxides, asbestos, coal powder and coke. But silica gel is not suitable because it is not inert to strong alkali and may be solubilized by the latter.

The preparation of the solid catalyst for the present invention may be carried out, for example, by dissolving one or more of said alkaline substances in a solvent such as water, alcohols, an inert solvent (e.g. benzene, toluene, xylene, dioxane, etc.) or two or more of them, followed by the addition of said solid and inert carrier in powdery or granular form to the solution, and finally be evaporating the solvent by suitable means, if desired, under reduced pressure. When active carton is employed as the carrier, caution should be taken for the preparation and handling of the solid catalyst, since the dried catalyst may catch fire when exposed in the air.

While the amount of the alkaline substance supported on the solid carrier should not be so little that the catalytic activity is lowered, too much amount of the same relative to the carrier is undesirable because the difficulties and the inconveniences which have been encountered in hitherto-known processes will arise. Furthermore, a carrier that has large surface area, e.g. activated charcoal, may support a relatively large amount of alkaline substance. In general, however, the ratio of the alkaline substance and the carrier may be selected from the range between 1:9 and 9:1, especially between 1:5 and 5.1, on the weight basis.

The alkylene oxides include, for example, ethylene oxide, propylene oxide, butylene oxide, isobutylene oxide, cyclohexene oxide, styrene oxide, butadiene oxide, etc., and they may of course be employed singly or in combination of two or more of them. Among them, ethylene oxide, propylene oxide and their mixtures are particularly preferable to obtain a good result.

As the initiators, there may be employed, for example:

glycols (such as ethylene glycol, propylene glycol);
triols (such as trimethylol propane, glycerol, hexane triols, triethanolamine, and 1,1,3-tris(p-hydroxyphenyl) propane);
tetrols (such as pentaerythritol and diglycerol); pentols such as 2,2,6,6-tetrakis(hydroxymethyl)cyclohexanol);
sugars (such as sucrose and raffinose);
sugar alcohols (such as xylitol, sorbitol, manitol, dulcitol, lactitol, sorbitans and mannitans);
glycosides (such as methyl glucoside);
primary or secondary amines (such as ethylene diamine, diethylene triamine, hexylene diamine, p-phenylene diamine and diaminotoluene); and
thioglycols (such as ethylene thioglycol).

These may of course be employed singly or mixedly. Among them, the desirable ones for the purpose are those having not less than three hydroxyl groups, and as especially preferable initiators are counted sugars, sugar alcohols, intramolecular anhydrides of sugar alcohol and pentaerythritol.

The desirable amount of the solid catalyst used may usually be equiamount or less in terms of the alkaline substance supported on the carrier relative to the amount of the alkali catalysts which have been hitherto-employed in known processes.

Reaction conditions for carrying out the desired reaction may be chosen from among those of hitherto-known processes depending on the concrete object intended at each occasion. In the process of the present invention, a solvent employable may include, for example, dimethylsulfoxide, dimethylformamide, dimethylacetamide, acylmorpholines, benzene, toluene, xylene, dioxane, tetrahydrofuran or two or more of them, but such a solvent may not be necessarily employed.

In general, it is unnecessary to heat the reactants at such a high temperature as 170°–200° C., and the reaction is usually carried out at a temperature between about 70° C. and about 150° C., especially between about 80° C. and 120° C.

The polymerization reaction is usually effected at atmospheric pressure, but it may of course be carried out at an elevated pressure up to 15 kilograms per square centimeter. However, the reaction can smoothly be effected at not higher than 10 kilograms per square centimeter.

To obtain a desirable product, it is recommended that the alkylene oxide is added gradually to the reaction mixture as the reaction proceeds.

For the purpose of comparison, the same procedures as described hereinbefore in connection with the present invention are followed by using the alkaline substance and the carrier concomitantly instead of the solid catalyst in pre-prepared form, but no effect over hitherto-known process is obtained.

An industrially preferable embodiment is to allow a mixture of alkylene oxide and initiator to flow onto the reaction tower packed with the solid catalyst, whereupon the objective polyoxyalkylene polymers are continuously produced.

For the purpose of giving those skilled in the art a better understanding of the invention, preferred embodiments of this invention are given by means of the following illustrative examples. However, it is to be understood that these examples are solely for the purpose of illustration and are not to be construed as limitations of this invention, variations and modifications being possible without departing from the spirit or scope of this invention. In these examples, percentages and parts are on the weight basis, unless otherwise noted, and abbreviation mm. means millimeter.

*Example 1*

To a solution of potassium hydroxide (10 parts) in water (100 parts) is added alumina (30 parts) of about 200–300 mesh (Japanese Industrial Standard mesh). The mixture is thoroughly stirred and water is evaporated on water bath under reduced pressure of about 30–40 mm. Hg to leave solid mass. The mass is then crushed to powder to obtain powdery catalyst.

A mixture consisting of the powdery catalyst (30 parts), sucrose (64 parts) and dimethylsulfoxide (150 parts) is agitated under heating a 120° C. in nitrogen gas, and propylene oxide is thereto added continuously, as the reaction proceeds, taking 8 hours. The resulting mixture is filtered, and dimethylsulfoxide is evaporated in vacuo from the filtrate. The residue is diluted wth equiamount of water, and is treated with carboxylic acid-type cation exchange resin (H form). From thus treated solution, water is evaporated to obtain polyether polyol (197 parts) as a pale brown viscous liquid showing the following properties:

Hydroxyl number _____ 426.3
Acid number _____ 0.051
Unsaturation (milliequivalent per gram) _____ 0.049

This product yields a good rigid urethane foam by the reaction with polyisocyanate compound (Allied Chemical Corp., "Nacconate–4040"). "Nacconate" is a registered trade name and "Nacconate–4040" used in this example is a phosgenation product of tolylene diamine, having the following properties:

Brown liquid free of sediment;
Amine equivalent 106;
Viscosity (Brookfield) 90 at 25° C.;
Specific gravity (25° C./25° C.) 1.26;
Solidification point lower than −15° C.; and
Approximate flash point (Cleveland open cup) 132° C.

The same procedure as mentioned above was followed by employing potassium hydroxide (7.5 parts) in place of the powdery catalyst (30 parts). Thereupon, it took more than 3 hours to dissolve the potassium hydroxide, and there was produced a large mass when propylene oxide was added, which made it impossible to continue the reaction. Moreover, the reaction could not be continued even by the use of an increased amount of dimethylsulfoxide (600 parts).

*Example 2*

The same reaction as in Example 1 is carried out by using the same amount (i.e. 150 parts) of dimethylformamide instead of dimethylsulfoxide to obtain polyoxypropylene sucrose (145 parts) having the following properties:

Hydroxy number _____ 489
Acid number _____ 0.09
Unsaturation (milliequivalent per gram) _____ 0.02

The use of dimethylacetamide in place of dimethylformamide affords the same result.

Example 3

To a solution of potassium hydroxide (200 parts) in water (1,000 parts) is added alumina (200 parts), and the mixture is processed after the manner of Example 1 to obtain powdery catalyst.

A mixture consisting of the powdery catalyst (336.6 parts), α-methyl-D-glucoside (1,456 parts) and dimethylsulfoxide (1,400 parts) is agitated under heating at 120° C., and propylene oxide is thereto added continuously until the reaction mixture amounts up to 5,800 parts. Then, the reaction mixture is treated in the same manner as in Example 1 to obtain pale brown polyether polyol (about 4,000 parts), which shows the following properties:

| | |
|---|---|
| Hydroxyl number | 421 |
| Acid number | 0.09 |
| Unsaturation (milliequivalent per gram) | 0.0069 |

This product has desirable qualities for the production of polyurethane foam.

The same procedure as mentioned above was followed by employing potassium hydroxide (168.3 parts) in place of the powdery catalyst (336.6 parts). Thereupon, the reaction mixture was solidified as soon as propylene oxide began to be added, and the reaction could not continue. In order to realize further reaction, it was necessary to melt the solid matter by heating the mixture at a temperature higher than 150° C.

Example 4

To a solution of potassium hydroxide (20 parts) in water (100 parts) is added activated charcoal (20 parts). The mixture is processed in the absence of air after the manner of Example 1 to obtain powdery catalyst.

A mixture consisting of the powdery catalyst (30 parts), sucrose (35 parts) and dimethylformamide (105 parts) is heated at 110–130° C. under stirring and subjected to the reaction with propylene oxide as in Example 1, whereupon the reaction takes place very smoothly and proceeds to yield polyether polyol.

| | |
|---|---|
| Hydroxyl number | 445.2 |
| Acid number | 0.04 |
| Unsaturation (milliequivalent per gram) | 0.005 |

On the other hand, the use of 50% aqueous solution (30 parts) of potassium hydroxide in place of the powdery catalyst brought about precipitation of white mass, and made it difficult to carry out further procedures. Moreover, carrying out procedures was also very difficult when either a solution prepared from metallic sodium (6 parts) and methanol (30 parts) or a solution prepared from metallic sodium (6 parts) and tertiary butanol (60 parts) was used in place of the powdery catalyst.

Example 5

To a solution of potassium hydroxide (60 parts) in water (300 parts) is added porous synthetic zeolite powder (60 parts). The mixture is then processed after the manner of Example 1 to obtain granular catalyst.

A mixture consisting of the granular catalyst (111.2 parts) and trimethylol propane (442.2 parts) is heated at 120° C., and propylene oxide is thereto added continuously until the reaction mixture amounts up to about 10,000 parts. After the reaction, solid matters are filtered off and the filtrate is purified to obtain polyoxypropylene triol (9,830 parts) showing the following properties:

| | |
|---|---|
| Hydroxyl number | 56.2 |
| Acid number | 0.02 |
| Unsaturation (milliequivalent per gram) | 0.04 |
| Sodium content (part per million) | 0.2 |
| Potassium content (parts per million) | 2.1 |

A similar result was obtained when used in place of the above-used granular catalyst either powdery catalyst prepared from a mixture of metallic sodium, methanol and alumina or powdery catalyst prepared from a mixture of metallic sodium, tertiary butanol and alumina.

Example 6

In the same manner as in Example 3, powdery catalyst is prepared.

A mixture consisting of the powdery catalyst (334 parts), 1,2,6-hexanetriol (900 parts) and 1,4-sorbitan (300 parts) is put in a reaction vessel equipped with reflux cooler and stirrer, and propylene oxide is added to the mixture at 110°–120° C. in nitrogen stream to allow the reaction to take place. When the reaction mixture excluding the catalyst amounts to 3,800 parts, the reaction is stopped and the resulting mixture is diluted with water (1,000 parts) and filtered. The filtrate is treated with carboxylic acid-type cation exchange resin (H form) and water is evaporated to obtain polyether polyol (3,800 parts) showing the following properties:

| | |
|---|---|
| Hydroxyl number | 389 |
| Acid number | 0.04 |

The product has qualities suitable for the production of rigid urethane foam.

Example 7

In the same manner as in Example 3, powdery catalyst is prepared.

A mixture consisting the powdery catalyst (167 parts), 1,2,6-hexanetriol (450 parts) and sorbitol (150 parts) is heated at 100°–120° C. under stirring at atmospheric pressure, and propylene oxide is thereto added to allow the reaction to take place. The reaction is continued until the reaction mixture excluding catalyst amounts to 1,800 parts, and the resulting mixture is treated as in Example 6 to obtain polyether polyol (1,800 parts) which shows the following properties:

| | |
|---|---|
| Hydroxyl number | 420 |
| Acid number | 0.02 |

The product has qualities suitable for producing rigid urethane foam.

Example 8

A mixture consisting of raffinose (3,470 parts), containing 5 moles of crystal water, and dimethylsulfoxide (5,000 parts) is heated at 120° C. in dry nitrogen stream to remove the crystal water, and the mixture is supplied with powdery catalyst (680 parts) prepared from potassium hydroxide and alumina in the same manner as in Example 3. Propylene oxide is dropped into the mixture at 110°–120° C., as the reaction proceeds, until the reaction mixture excluding the catalyst amounts to about 15,000 parts. The reaction mixture is filtered with suction to remove solid matters, and solvent is evaporated under reduced pressure from the filtrate. The residue is dissolved in an equi-volume mixture (about 10,000 parts) of methanol and water, and the solution is treated with carboxylic acid-type cation exchange resin (H form). Solvent is evaporated from the thus-treated solution to leave polyether polyol (about 9,000 parts) as brown viscous liquid having the following properties:

| | |
|---|---|
| Hydroxyl number | 356 |
| Acid number | 0.01 |
| Unsaturation (milliequivalent per gram) | 0.015 |

Example 9

In a similar manner to that of Example 8, raffinose (631 parts) containing 5 moles of crystal water is dehydrated in dimethylsuloxide (5,000 parts), and is allowed to react with propylene oxide in the presence of the powdery catalyst (149.4 parts) prepared from potassium hydroxide and alumina as in Example 3. The reaction is stopped when the whole reactant mass amounts to 2,050 parts. Purification of the reaction mixture as in Example 8 affords polyether polyol (about 1,900 parts) showing the following properties:

| | |
|---|---|
| Hydroxyl number | 495 |
| Acid number | 0.08 |
| Unsaturation (milliequivalent per gram) | 0.009 |

*Example 10*

A mixture consisting of raffinose (199 parts) containing 5 moles of crystal water, trimethylol propane (600 parts) and powdery catalyst (166.8 parts) which was prepared from potassium hydroxide and alumina as in Example 3 is heated at 120°–150° C. with stirring, and propylene oxide is gradually added thereto, whereupon the reaction proceeds smoothly. The reaction is stopped when the whole reaction mixture amounts to about 2,200 parts, and subsequent purification after the manner of Example 8 yields polyether polyol (2,000 parts) showing the following properties:

| | |
|---|---|
| Hydroxyl number | 390 |
| Unsaturation (milliequivalent per gram) | 0.006 |

*Example 11*

In a manner similar to that of Example 1, powdery catalyst is prepared from potassium hydroxide (25 parts) and alumina (45 parts).

A mixture consisting of the powdery catalyst (70 parts), pentaerythritol (170 parts) and xylene (600 parts) is agitated under heating at 120° C., and propylene oxide is thereto added in nitrogen stream, as the reaction proceeds, until the reaction mixture amounts to about 1,200 parts. Then, xylene is distilled off and the reaction is further continued until the hydroxyl number of the product becomes about 56. The reaction mixture is adjusted to weakly acid with hydrochloric acid. Precipitating potassium chloride is filtered off and volatile components are removed from the filtrate at 100° C. in dry nitrogen stream to leave polyether polyol (4,900 parts) which shows the following properties:

| | |
|---|---|
| Hydroxyl number | 55.8 |
| Acid number | 0.01 |
| Unsaturation (milliequivalent per gram) | 0.03 |
| Viscosity (centipoises at 25° C.) | 690 |
| Water content (percent) | 0.03 |

*Example 12*

In a manner similar to Example 1, powdery catalyst is prepared from potassium hydroxide (25 parts) and alumina (45 parts).

A mixture consisting of the powdery catalyst (70 parts), pentaerythritol (170 parts) and xylene (600 parts) is agitated under heating at 120° C., and propylene oxide is added thereto in nitrogen stream, as the reaction proceeds, until the reaction mixture amounts to 1,200 parts. Then, xylene is distilled off and the reaction is further continued until 4,560 parts of propylene oxide is consumed. Subsequently, ethylene oxide (420 parts) is allowed to react with the polyoxypropylene polymer.

After the reaction, insolubles are filtered off and the filtrate is neutralized with hydrochloric acid to show weakly acid. Potassium chloride precipitated is filtered off and the filtrate is heated at 120° C. in dry nitrogen stream to remove volatile impurities, whereupon polyether tetrol (5,000 parts) showing the following properties is obtained:

| | |
|---|---|
| Hydroxyl number | 55.6 |
| Acid number | 0.01 |
| Unsaturation (milliequivalent per gram) | 0.03 |
| Viscosity (centipoises at 25° C.) | 750 |
| Water content (percent) | 0.006 |

Having thus disclosed the invention, what is claimed is:

1. In a process for producing polyoxyalkylene polymers by allowing alkylene oxide to react with an initiator selected from the group consisting of sugars, alkyl glycosides, pentaerythritol and sorbitans in the presence of a catalyst, the improvement according to which the catalyst is solid catalyst consisting essentially of an alkaline substance selected from the group consisting of an alkali metal hydroxide and alkali metal lower alkoxides on a solid carrier inert to the alkaline substance.

2. In a process for producing polyoxyalkylene polymers by allowing alkylene oxide to react with a member of the group consisting of trimethylol propane, 1,2,6-hexanetriol and sorbitol in the presence of catalyst, the improvement according to which the catalyst is solid catalyst consisting essentially of an alkaline substance selected from the group consisting of an alkali metal hydroxide and alkali metal lower alkoxides on solid carrier inert to the alkaline substance.

3. The improvement according to claim 1, wherein the solid carrier is a member selected from the group consisting of active carbon, alumina and zeolite.

4. The improvement according to claim 1, wherein the alkaline substance is potassium hydroxide and the solid carrier is alumina.

5. The improvement according to claim 2, wherein the solid carrier is a member selected from the group consisting of active carbon, alumina and zeolite.

6. The improvement according to claim 2, wherein the alkaline substance is potassium hydroxide and the solid carrier is alumina.

References Cited

UNITED STATES PATENTS

| 2,976,274 | 3/1961 | McNeely et al. | 260—209 |
| 3,042,666 | 7/1962 | Gentles | 260—209 |
| 3,167,538 | 1/1965 | Kiaser et al. | 260—209 |
| 3,222,357 | 12/1965 | Wismer et al. | 260—209 |

LEWIS GOTTS, *Primary Examiner.*

J. R. BROWN, *Assistant Examiner.*